April 25, 1944.   B. F. MASON   2,347,357
ORE AGITATOR
Filed May 12, 1942

Inventor
Benjamin F. Mason
By Lyon & Lyon
Attorneys

Patented Apr. 25, 1944

2,347,357

UNITED STATES PATENT OFFICE 2,347,357

ORE AGITATOR

Benjamin F. Mason, Dinuba, Calif.

Application May 12, 1942, Serial No. 442,603

2 Claims. (Cl. 259—3)

This invention relates to ore agitators and is more particularly related to an ore agitator for use in the leaching of minerals from ore as, for example, copper from copper ores.

This invention is directed to an improvement over the ore agitator as defined in the patent granted to me August 2, 1932, No. 1,869,488, for Ore agitator.

In the leaching of minerals from ore utilizing leaching drums, it is preferable to provide for agitation of the ore and leaching solution while providing the oxygen necessary for carrying out the leaching operation and for disposal of the gases formed during leaching.

It is therefore an object of this invention to provide an ore agitator for the leaching of minerals from ores which includes a cylinder supported for rotation and in which means are provided for the introduction of the required leaching chemicals, solutions and air and for disposal of the gases as generated during the leaching operation.

Another object of this invention is to provide an ore agitator for the leaching of minerals from an ore which is of large capacity permitting the handling of a large volume of leaching solution and ore and which is so constructed as to maintain continuous agitation of the ore and solution while providing for the introduction of the air or oxygen and disposal of the gases generated during the leaching operation in such manner as to provide for a more perfect leaching of the minerals from the ores.

Other objects and advantages of this invention it is believed will be apparent from the following detailed description of a preferred embodiment thereof as illustrated in the accompanying drawing.

Figure 1:
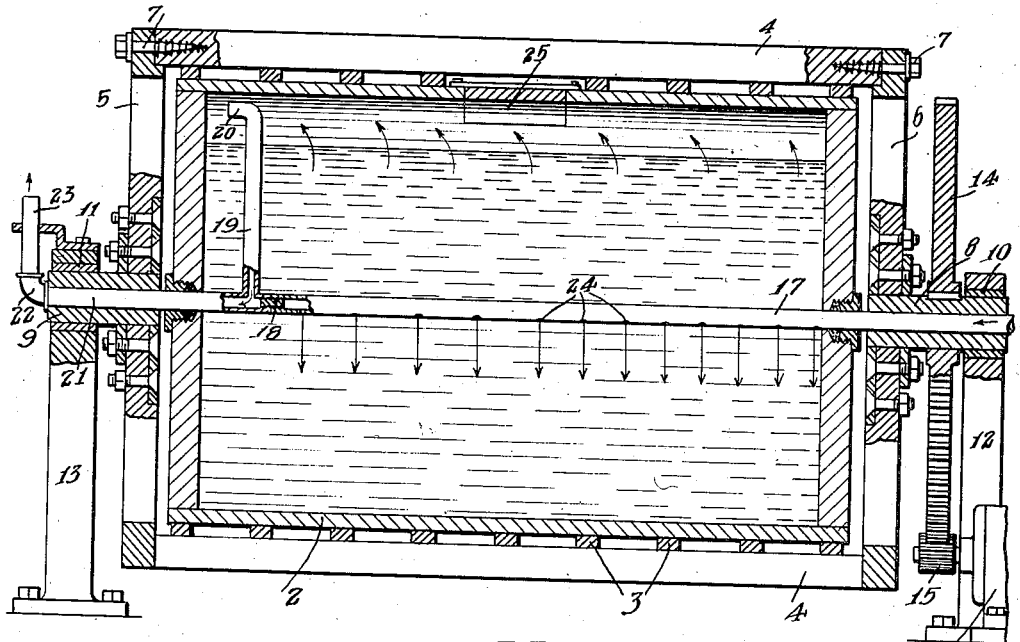
Figure 1 is a sectional elevation of the ore agitator embodying my invention.
Figure 2:
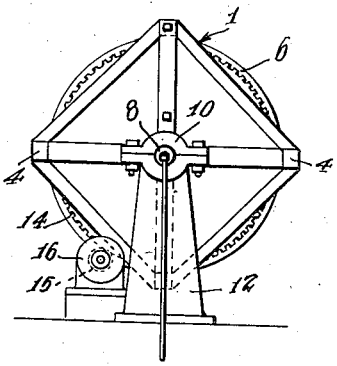
Figure 2 is an end view thereof on a reduced scale.

In the preferred embodiment of my invention as illustrated in the accompanying drawing 1 indicates a cradle which may be of any suitable or desirable form and within which there is supported a cylinder 2. The cylinder 2 is preferably formed of such a material as will be non-reactive to the chemical solutions utilized in carrying out the leaching operations. Such a material may be wood, plastic or in some instances cast iron or other metals. The cylinder 2 may be supported within the cradle 1 by the use of wedge blocks 3 driven between the wall of the cylinder and the longitudinal members 4 of the cradle 1. The cradle 1 is provided with end discs or members 5 and 6 which are suitably secured to the longitudinal member 4 by any suitable form of fastening as indicated at 7. Secured to the end members 5 and 6 are supporting trunnions 8 and 9. The trunnions 8 and 9 are journaled in bearings 10 and 11 in the supporting pedestals 12 and 13. Secured to the trunnion 8 is a gear 14 which is adapted to mesh with the drive pinion 15 driven by a suitable motor 16. The trunnions 8 and 9 are bored longitudinally along their axis to receive circulation conduit 17 which passes axially through the discs 5 and 6 and through the cylinder 2.

The conduit 17 is mounted stationary so that the cradle 1 and cylinder 2 revolve therearound. The conduit 17 is blocked or dammed as indicated at 18 and is provided on its discharge side with a stand pipe 19 which extends upwardly to a point near the uppermost portion of the cylinder 2. The stand pipe 19 is open at its upper end 20. The discharge end 21 of the conduit 17 is threaded to an elbow 22 which receives a discharge conduit 23 through which the generated gases are discharged upon the exterior of the cylinder 2. The conduit 17, after passing through the trunnion 8, is connected with any suitable source of air under pressure or supply of leaching chemicals. The conduit 17 to the dam 18 thus provides the means for introducing into the cylinder 2 the chemicals and air required for the proper leaching of the minerals from the ore and for this purpose it is provided along its length with a plurality of discharge apertures 24 spaced along the conduit 17 within the cylinder 2 so as to obtain a thorough distribution of the chemicals required for the leaching and of air into the leaching solution.

As the stand pipe 19 extends upwardly to a point near the upper region of the cylinder 2, it is at all times above the liquid level in the cylinder 2. Thus the generated gases may enter the open end 20 of the stand pipe 19 and pass out through the discharge pipe 23 and be disposed of without danger of building up a gas pressure within the cylinder.

This construction also permits for the continuous entry of air under pressure if desired into the cylinder 2 where oxidation performs an essential part of the leaching of the mineral from the ores.

There is also provided in the cylinder 2 a charging door 25 through which the ground ore to be leached is introduced. The door is secured to the cylinder 2 by any suitable means which will maintain a fluid-tight connection.

Through the utilization of the ore agitator embodying my invention it is possible to obtain a more efficient extraction of the minerals from the ore as, for example, of copper from copper-bearing ores. The ore is charged into the cylinder 2 through the door 25 and then the chemical solution is introduced into the cylinder through the conduit 17. The cylinder is then slowly rotated in order to maintain a continuous agitation of the ore and solution during the leaching proces. In order for this operation to be effectively carried out, it is desirable to have air in the cylinder not only for the purpose of maintaining the required oxygen, but also for aiding in the agitation of the solution and ore. Thus the air may be introduced through the perforated conduit 17 under pressure where desired. The exhaust air, as well as the gases generated during the leaching operation are then discharged through the stand pipe 19.

Having fully described my invention, it is to be understood that I do not wish to be limited to the details herein set forth, but my invention is of the full scope of the appended claims.

I claim:

1. An ore agitator, including a cylinder, means for supporting the cylinder including end trunnions and bearings for supporting the trunnions, means for rotating the cylinder, and a supply and discharge conduit extended through the trunnions into the cylinder, a dam in the conduit, dividing the said conduit into inlet and discharge sections, and a stand pipe secured to the conduit in the discharge section beyond the dam and extending upward in the cylinder to a point above the liquid level therein.

2. In an ore agitator, the combination of a cylinder, means for supporting the cylinder including end trunnions and bearings for supporting the trunnions, means for rotating the cylinder, a supply and discharge conduit extended through the trunnions into the cylinder, a dam in the conduit, a vent standpipe secured to the conduit beyond the dam and extending upward in the cylinder to above the liquid level therein, and means in the conduit before the dam for admitting fluid into the cylinder below the liquid level therein.

BENJAMIN F. MASON.